United States Patent Office 3,252,957
Patented May 24, 1966

3,252,957
POLYMERIC 5-METHYLENEBICYCLO[2.2.1]-2-HEPTENE
Huey Pledger, Jr., Pratt, W. Va., assignor to The Dow Chemical Company, Midland, Mich., a corporation of Delaware
No Drawing. Filed Dec. 22, 1961, Ser. No. 161,437
2 Claims. (Cl. 260—93.1)

This invention relates to a new thermoplastic product and to a process for making it. More specifically, it relates to a new homopolymer of 5-methylenebicyclo[2.2.1]-2-heptene.

Terpenes and compounds of related structure are known to form polymers when treated with Friedel-Crafts catalysts or Ziegler type catalysts. For example α-pinene and β-pinene polymerize in the presence of $AlCl_3$ or $BF_3$ via a ring opening mechanism to make resins having cyclohexene rings in their recurring units of molecular structure. Bicyclo[2.2.1]-2,5-heptadiene and dicyclopentadiene when treated with an organo-metallic complex obtained by the reaction of a titanium halide with a metal alkyl form polymers containing one double bond per recurring unit and these polymers are then easily crosslinked to make high-melting, brittle solids. Similarly, 5-methylenebicyclo[2.2.1]-2-heptene also yields unsaturated and crosslinked polymers in the presence of such a catalyst.

In view of these facts, it is unexepected and surprising to discover that when 5-methylenebicyclo[2.2.1]-2-heptene is contacted with Friedel-Crafts catalysts such as $AlCl_3$, $AlBr_3$ or $BF_3$, polymers are obtained which have a molecular structure consisting of linear chains of recurring units containing essentially no residual unsaturation. Analytical evidence indicates that a ring closure has taken place in the polymerization rather than either a ring opening or a polymerization involving only one of the two double bonds in each molecule as heretofore known. The recurring units of the polymer molecules evidently contain nortricyclene ring structures which are stable and inert, thereby making these polymers resistant to crosslinking and stable to oxidation. The absence of olefinic double bonds in these polymers and infrared spectroscopic examination indicate that these nortricyclene ring structures have the following configuration:

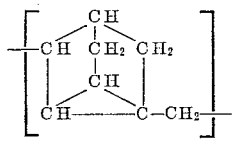

The polymerization may be carried out at a temperature of about −70° C. to about 120° C. A temperature in the range −5° to 25° C. is preferred and it has been found most advantageous to run the process at about −5° to 5° C. When the polymerization is run above about 25° C., products are obtained which have lower average molecular weight and correspondingly lower inherent viscosities. (The term inherent or limiting viscosity is used as defined in the Journal of Polymer Science, vol. 8, p. 270.)

Normally, it is preferred to polymerize 5-methylenebicyclo[2.2.1]-2-heptene (hereinafter referred to as MBH) in an inert solvent solution although the presence of solvent is not necessary and it may be dispensed with if desired. Any solvent may be used which is not reactive with either the halide catalyst or the monomer under the conditions of the reaction. Substances containing functional groups such as amino, hydroxy, aldehyde, or carboxyl are therefore not usable. Suitable solvents include hydrocarbons such as octane, benzene, toluene, ethylbenzene, and xylene, and chlorinated solvents, for example methylene chloride, ethylene dichloride, and similar materials. Polymers with higher molecular weight are obtained when solvents having relatively high dielectric constants are employed. The proportion of solvent to monomer is not critical although undue dilution of the monomer is to be avoided as a matter of convenience.

Inorganic polyhalides known to act as catalysts in Friedel-Crafts reactions are effective initiators for MBH polymerization. $AlCl_3$, $AlBr_3$, and $BF_3$ are preferred and either $AlCl_3$ or $BF_3$ is ordinarily used. By $BF_3$ is meant either the substance itself or a molecular complex such as boron trifluoride etherate. A proportion of about 0.4–1.0% by weight of catalyst based on the amount of monomer is preferred. Smaller amounts of catalyst may be used so long as the amount is sufficient to cause appreciable polymerization. Higher proportions of catalyst may also be used, but the polymers so obtained have progressively lower average molecular weights.

The polymerization is ordinarily run at atmospheric pressure under a blanket of inert gas such as nitrogen to avoid inactivation of the catalyst by contact with oxygen or atmospheric moisture. Reaction pressures above or below this level may be employed.

EXAMPLE 1

A solution of 44.6 g. of MBH in 100 ml. of xylene was cooled to 3° C. About 0.2 g. of $AlCl_3$ was added under a blanket of dry nitrogen, whereupon the temperature of the solution rose instantly to 30° C. After 10 minutes at about 30° C., a liter of methanol and 2 liters of acetone were added, precipitating a white powdery polymer from the solution. The precipitate was separated by filtration, redissolved in xylene, and reprecipitated in excess acetone. The dried polymer weighed 7 g. It was a white powder melting at 130–134° C. and it had an inherent viscosity [η] of 0.097 as determined from a plot of viscosities measured at concentrations of 0.05, 0.1, 0.2, 0.3, and 0.5 g./100 ml. of benzene at 25.0 C. Analysis of the polymer, including infrared spectroscopic examination and titration with potassium permanganate solution, showed no trace of residual unsaturation and indicated that the polymer was linear in structure and contained recurring nortricyclene ring units. A film cast on glass from a xylene solution of the polymer was hard, clear, and strongly adherent to the glass. Hard, transparent moldings were obtained by compression molding and fibers could be drawn from the polymer melt.

EXAMPLE 2

A solution of 212 g. of MBH in 500 ml. of xylene was cooled to 0° C. and 0.0077 g. mole of $BF_3$ as the etherate was added under a blanket of dry nitrogen. After 15 minutes another like portion of $BF_3$ was added and the solution was maintained at 0–5° C. for 30 minutes. It was then successively let warm to 27° C. in about 20 minutes, recooled to 0° C., and allowed to warm to 10° C. in 10 minutes. The polymerization catalyst was inactivated by the addition of 1.0 ml. of water and 3 ml. of methanol. The polymerization mixture was then poured into 3 liters of methanol and the resulting white powdery precipitate was separated. The precipitate was beaten with 250 ml. of methanol, filtered, and dried to a constant weight of 115.8 g. The polymer melted at 126–155° C. and had an inherent viscosity [η] of 0.09. It was similar in other respects to the product of Example 1.

EXAMPLES 3–10

By procedure similar to that described in Example 2 polymerizations were carried out under a nitrogen blanket at about 0° C. in several solvents and at different concentrations of monomer. Varying amounts of $BF_3$ etherate were used as the polymerization initiator. The polymerizations were stopped by the addition of 2.5–5.0 ml. of ethanol to the mixtures and the polymeric products were precipitated by pouring the solutions into excess ethanol. Table I lists some of the data obtained from these experiments. The mole percent $BF_3$ is calculated on the basis of the MBH present. Conversions are given as the percent of starting monomer disappearing. Yields of polymer obtained represented about 90–100% of the monomer consumed.

Table I

| Weight percent MBH | Solvent | Mole percent $BF_3$ | Percent Conv. | $[\eta]$ | M.P., °C. |
|---|---|---|---|---|---|
| 30 | Xylene | 0.46 | 34.7 | 0.071 | 136–167 |
| 30 | do | 0.92 | 73.7 | 0.071 | 134–158 |
| 30 | do | 1.38 | 86.8 | 0.069 | 138–157 |
| 30 | do | 2.77 | 92.5 | 0.068 | 126–140 |
| 5 | $CH_2ClCH_2Cl$ | 0.46 | 82.9 | 0.084 | 154–166 |
| 10 | $CH_2ClCH_2Cl$ | 0.46 | 83.1 | 0.090 | 161–176 |
| 30 | $CH_2ClCH_2Cl$ | 1.00 | 72.5 | 0.108 | 153–169 |
| 30 | $CH_2Cl_2$ | 0.46 | 81.7 | 0.105 | 183–198 |

Analytical examination showed that the polymers obtained were free of unsaturation and were of the same structure as the products of Examples 1 and 2. These products could be compression molded into hard, clear articles and clear films could be cast from their solvent solutions. Fibers could be drawn from the melted polymers.

The polymers of this invention are particularly advantageous because of their unreactive and stable nature which is a result of their saturated molecular strucre. These materials are conseqnetly resistant to embrittlement and degradation caused by oxidation and exposure to ultraviolet light. Their inert character is attested to by the fact that they are essentially unaffected by four hours contact with boiling aqueous alkaline potassium permanganate solution. The properties of these polymers may be varied by compounding them with various compatible stabilizers, fillers, plasticizers, pigments, fibrous reinforcing agents, and the like. They may also be blended with other suitable resinous materials.

I claim:
1. A normally solid homopolymer of 5-methylenebicyclo[2.2.1]-2-heptene, said homopolymer having a molecular structure consisting essentially of linear chains of recurring units of the formula

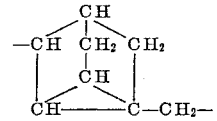

said homopolymer having a melting point from about 126° C. to about 198° C. and an inherent viscosity $[\eta]$ at 25° C. of about 0.068 to about 0.108.

2. A process for making a normally solid homopolymer of 5-methylenebicyclo[2.2.1]-2-heptane having a substantially linear molecular structure essentially free of residual unsaturation, which process comprises contacting 5-methylenebicyclo[2.2.1]-2-heptane in the liquid phase with an effective amount of a catalyst selected from the group consisting of $AlBr_3$, $AlCl_3$, and $BF_3$ at a temperature from about —70° C. to about 120° C. for a period of time sufficient for a significant amount of polymerization to take place.

References Cited by the Examiner
UNITED STATES PATENTS 2,359,810   10/1944   Trepp _____ 260—93.1
2,996,441   8/1961    Nelson et al. _____ 204—154

FOREIGN PATENTS 228,056   5/1960   Australia.

OTHER REFERENCES

Gaylord et al.: Linear and Stereoregular Addition Polymers (1959), Interscience Publishers, N.Y., page 322.

JOSEPH L. SCHOFER, Primary Examiner.

WILLIAM H. SHORT, DONALD LEE OLSON, ELLIOT M. OLSTEIN, Assistant Examiners.